(12) United States Patent
Abe et al.

(10) Patent No.: US 7,903,198 B2
(45) Date of Patent: Mar. 8, 2011

(54) LIQUID CRYSTAL DISPLAY DEVICE

(75) Inventors: Kazutoshi Abe, Kirishima (JP); Naoya Imamura, Kirishima (JP); Satoshi Kuramoto, Kirishima (JP)

(73) Assignee: Kyocera Corporation, Kyoto (JP)

( * ) Notice: Subject to any disclaimer, the term of this patent is extended or adjusted under 35 U.S.C. 154(b) by 153 days.

(21) Appl. No.: 11/913,843

(22) PCT Filed: May 30, 2006

(86) PCT No.: PCT/JP2006/310711
§ 371 (c)(1),
(2), (4) Date: Nov. 7, 2007

(87) PCT Pub. No.: WO2006/129625
PCT Pub. Date: Dec. 7, 2006

(65) Prior Publication Data
US 2009/0066877 A1    Mar. 12, 2009

(30) Foreign Application Priority Data
May 30, 2005  (JP) ................................ 2005-157084

(51) Int. Cl.
*G02F 1/1335* (2006.01)
*G02F 1/1333* (2006.01)
*F21V 7/04* (2006.01)

(52) U.S. Cl. ............... 349/65; 349/58; 349/61; 362/612; 362/613; 362/632

(58) Field of Classification Search .................... 349/65, 349/61, 58; 362/612–613
See application file for complete search history.

(56) References Cited

U.S. PATENT DOCUMENTS
4,714,983 A * 12/1987 Lang ............................... 362/27
7,175,329 B1 * 2/2007 Chou ............................. 362/612
2004/0208210 A1 10/2004 Inoguchi ......................... 372/36

FOREIGN PATENT DOCUMENTS
CN  2585273 A  11/2003
CN  2694315 A   4/2005
(Continued)

OTHER PUBLICATIONS

Chinese language office action and its English language translation for corresponding Chinese application 200680019399.1 lists the references above. European search report for corresponding European application 06756707.3 lists the reference above.

*Primary Examiner* — W. Patty Chen
(74) *Attorney, Agent, or Firm* — DLA Piper LLP (US)

(57) ABSTRACT

The present invention relate to a liquid crystal display device using a light emitting diode (LED) module as a light source for backlight. Storing portions (21a-21e) are provided at positions facing a light emitting diode modules (25) on a light guide plate (21) constituting the backlight, and the light emitting diode modules (25) are inserted into the storing portions (21a-21e). Furthermore, under a status where an insulating substrate (26) mounted with the light emitting diode modules (25) is held by a holding plate (28), the holding plate (28) is removably attached to a heat sink substrate (27). The backlight has a structure wherein the light emitting diode module (25) can be replaced. Furthermore, since heat generated at the light emitting diode module (25) can be efficiently dissipated to the heat sink substrate (27), temperature increase of the light emitting diode module (25) is suppressed, and lifetime can be lengthened, and deterioration of luminous efficiency can be prevented.

10 Claims, 4 Drawing Sheets

FOREIGN PATENT DOCUMENTS

| | | |
|---|---|---|
| JP | 2001-184924 | 7/2001 |
| JP | 2003215547 A | 7/2003 |
| JP | 2004-171948 | 6/2004 |
| JP | 2004-233810 | 8/2004 |
| JP | 2004-311791 | 11/2004 |
| JP | 2004-349143 | 12/2004 |
| JP | 2005-038771 | 2/2005 |
| JP | 2005-135862 | 5/2005 |
| JP | 2006-098500 | 4/2006 |

* cited by examiner

LIQUID CRYSTAL DISPLAY DEVICE

CROSS-REFERENCE TO THE RELATED APPLICATIONS

This application is a National stage of international application No. PCT/JP2006/310711 filed May 30, 2006, which also claims benefit of priority under 35 U.S.C. §119 to Japanese patent application No. 2005-157084 filed May 30, 2005, the entire contents of which are incorporated by reference.

TECHNICAL FIELD

The present invention relates to a liquid crystal display device comprising a liquid crystal display panel and a backlight, and in particular, to a liquid crystal display device which utilizes a light emitting diode (LED) module as a light source for backlight.

BACKGROUND ART

Conventionally, transmissive-type and semi-transmissive-type liquid crystal display devices comprise a liquid crystal display panel and a backlight for supplying light transmitting to the liquid crystal panel.

Generally, a backlight includes a light source and a light guide plate, and a small fluorescent tube called CCFL (cold cathode fluorescent tube) is used as the light source. A first principal surface (front surface) of the light guide plate is disposed so as to correspond to the display area of the liquid crystal display panel, and a diffusion area for diffusing and reflecting light toward the front surface side is provided on a second principal surface (back surface) thereof opposite to the aforementioned principal surface.

The CCFL light source is disposed at an end surface of the light guide plate, and light of CCFL incident on the end surface of the light guide plate is transmitted into the light guide plate, and is diffused/reflected on the back surface side of the light guide plate to be directed from the light guide plate toward the liquid crystal display panel. Thus, the light source is converted from a linear light source into a homogeneous planar light source to be utilized as the light source for the liquid crystal display device.

However, this CCFL light source uses Hg (mercury) encapsulated in a discharge tube, and ultraviolet rays emitted from mercury excited by electrical discharge strike the fluorescent substance on the CCFL tube wall to be converted into visible light rays. For this reason, when considering the environmental aspect, using an alternative light source is required for restricting the use of hazardous mercury. In addition, in order to illuminate the CCFL, a high-voltage and high-frequency switching circuit is necessary. However, since this generates high frequency noise, not only noise prevention is additionally required, but also problems such as slow light-up under low temperature and the like are prone to arise.

In the meantime, as a new light source, a backlight utilizing a light emitting diode (LED) module storing light emitting diode chips characterized by a point light source has been proposed.

In tune with the recent trends toward lower prices, higher luminous efficiency and environmental regulations, this backlight (LED backlight) using the light emitting diode module is becoming widely used as the backlight for liquid crystal display panels.

With increased brightness and size (of the display area) of liquid crystal display devices, arranging a plurality of light emitting diode modules in an LCD device can be taken into consideration.

Accordingly, when an LED backlight is used for a high brightness, large size liquid crystal display panel, the light emitting diode module, which is a point light source, needs to be converted into a planar light source that emits light rays evenly (light source that has been converted into homogeneous light rays at the light-emitting surface of the light guide plate). For this reason, it is necessary to adjust the material and structure of the diffusion area of the back surface of the light guide plate, as well as to dispose the light emitting diode module at an optimum position in accordance with the optical characteristics thereof.

The greatest problem here is lifetime of the light emitting diode module. The warranty life (half-life of luminance) of a conventional, commonly used CCFL at a tube current of 5 mA is 50000 hours at an ambient temperature of 25° C., and 45000 hours at an ambient temperature of 60° C. On the other hand, as for the lifetime of an LED chip, for example, in the case of a top-view type LED (NSCW455) produced by Nichia Corporation, estimated lifetime data (half-life of luminance) at forward current, F=20 mA, is about 12000 hours at an ambient temperature of 25° C., and only about 5500 hours at 50° C. It is obvious that lifetime of light emitting diode module is shorter than that of CCFL.

Because of many technical difficulties, it would be unrealistic to expect a light emitting diode module to have a lifetime equivalent to that of CCFL at this time.

It is therefore necessary to provide a light emitting diode module used as a backlight for a liquid crystal display device with a replaceable structure.

As one example of prior art related to the mounting of a light emitting diode module, there is a planar light source apparatus disclosed in Japanese Unexamined Patent Publication NO. 2001-184924.

Patent document 1: Japanese Unexamined Patent Publication NO. 2001-184924

DISCLOSURE OF THE INVENTION

Problems to be Solved by the Invention

As described above, the lifetime of a light emitting diode module significantly drops with increase in ambient temperature.

Demands from the users of liquid crystal display devices using light emitting diode modules include a lifetime equivalent to that of CCFL, or if the lifetime equivalent to CCFL is not satisfied, a light emitting diode module with a replaceable structure. Since it is technically impossible to realize a light emitting diode module having a lifetime equivalent to that of CCFL, providing a liquid crystal display device with a replaceable light emitting diode module is necessary to meet the users' demand.

Even when the light emitting diode module is replaceable, it is of course undesirable that the light emitting diode module needs to be replaced after only several thousands hours of use. Although the demand for a lifetime equivalent to that of CCFL cannot be met, it is important to prolong the lifetime to reduce the number of replacement.

The requirements that the light emitting diode module should satisfy include: having a replaceable structure; a prolonged lifetime by suppressing temperature increase; and being disposed at an optimum location with respect to the light incident surface of the light guide plate.

It is an object of the present invention to provide a liquid crystal display device employing a replaceable light emitting module used as a light source.

Means for Solving the Problems

A liquid crystal display device according to the present invention comprises: a liquid crystal display panel having a display area including a plurality of pixel areas; a light guide plate disposed external to a first principal surface of the liquid crystal display panel so as to correspond to the display area; a heat sink substrate disposed on a first principal surface of the light guide plate; and a light source comprising an insulating substrate and a plurality of light emitting diode modules that are arranged and mounted on one principal surface of the insulating substrate for emitting light into the light guide plate, wherein the light source is secured to a holding plate, and the holding plate is removably attached to the heat sink plate.

In addition, a storing portion for storing a light emitting diode may be provided in an end portion of the light guide plate.

The liquid crystal display device with this structure is mounted with a light emitting diode module on one principal surface of the insulating substrate, wherein the light emitting diode module has the light emitting surface on one of the side surfaces perpendicular to the mounting surface of the insulating substrate for mounting the light emitting diode module thereon (side-type light emitting diode module).

Furthermore, a storing portion is provided in a side end portion on the light source side of the light guide plate at a location corresponding to the light emitting diode module, and the light emitting diode module is stored therein.

The insulating substrate with the light emitting diode module mounted thereon in the foregoing manner is connected to the holding plate made of, for example, a metal, and the holding plate and the heat sink are secured in surface contact with each other. This allows the holding plate to be detached so that the light emitting diode module mounted on the insulating substrate can be changed/replaced. Further, this enables stable securing while adjusting the positional relationship between the light source including the light emitting diode module and the light guide plate to the predetermined relationship.

In addition, in replacing the insulating substrate with the light emitting diode module mounted thereon, by replacing the insulating substrate with an insulating substrate mounted with another light emitting diode module having different optical characteristics, the brightness of the backlight and the like can be changed easily as desired.

When the storing portion is formed as an storing portion into which a plurality of light emitting diode modules arranged in a row on the insulating substrate can be inserted, such as a long hole, design change of the number of light emitting diode modules to be mounted on the insulating substrate is possible, thereby allowing replacements for more purposes.

Since heat conducted from the light emitting module to the back surface side of the insulating substrate can be dissipated to the holding plate and heat sink substrate, heat can be stably dissipated.

In addition, a bonding material with high thermal conductivity that is interposed between the insulating substrate and the holding plate in intimate contact therewith allows heat to be dissipated to the heat sink substrate more stably.

According to the present invention, the light emitting diode module is positioned with respect to the storing portion in the end portion of the light guide plate so as to be disposed at an optimum location in terms of optical characteristics, so that decrease in luminous efficiency can be suppressed. In addition, since the insulating substrate and the heat sink substrate are secured in intimate contact with each other by means of the high-thermal-conductivity bonding material and the holding plate, heat emitted from the light emitting diode module can be conducted securely to the heat sink substrate, which makes it possible to suppress temperature increase in the light emitting diode module to a minimum.

In other words, according to the present invention, it is possible to provide a liquid crystal display device including an LED backlight in which the light emitting diode module is replaceable according to the need.

Moreover, since the present invention not only allows the light emitting diode module to be replaceable, but also allows heat generated from the light emitting diode module to be dissipated efficiently from the insulating substrate to the heat sink substrate, temperature increase in the light emitting diode module can be suppressed, and decrease in luminous efficiency can be restricted. As a result, a bright, long-life liquid crystal display device can also be realized.

The foregoing and other advantages, features and effects of the present invention will be apparent from the following description of preferred embodiments with reference to the accompanying drawings.

DESCRIPTION OF REFERENCE NUMERALS

Figure 1:
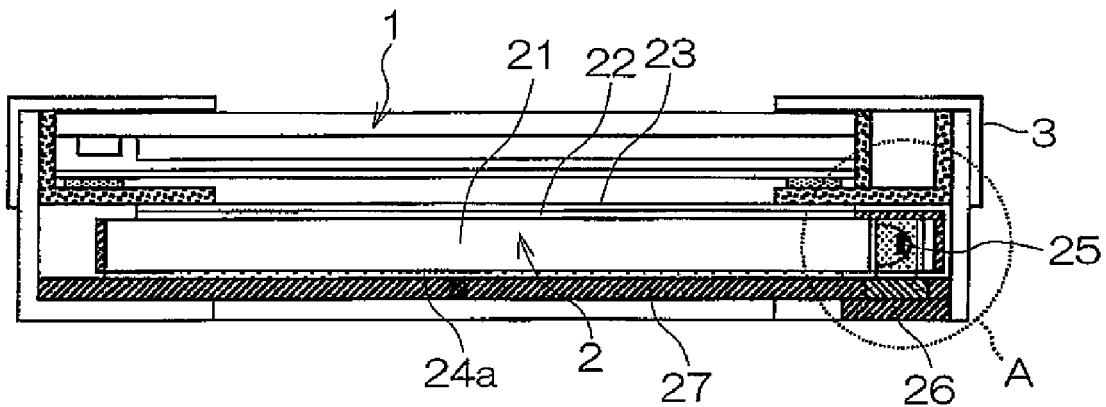
FIG. 1 is a schematic sectional view of a liquid crystal display device according to the present invention.

1. Liquid crystal display panel
2. Backlight
21. Light guide plate
25. Light emitting diode module
21a-21f. Storing portions
26. Insulating substrate
27. Heat sink substrate
28. Metal holding plate

BEST MODE FOR CARRYING OUT THE INVENTION

Hereinafter, the liquid crystal display device according to the present invention will be described in detail with reference to the drawings.

Figure 2:
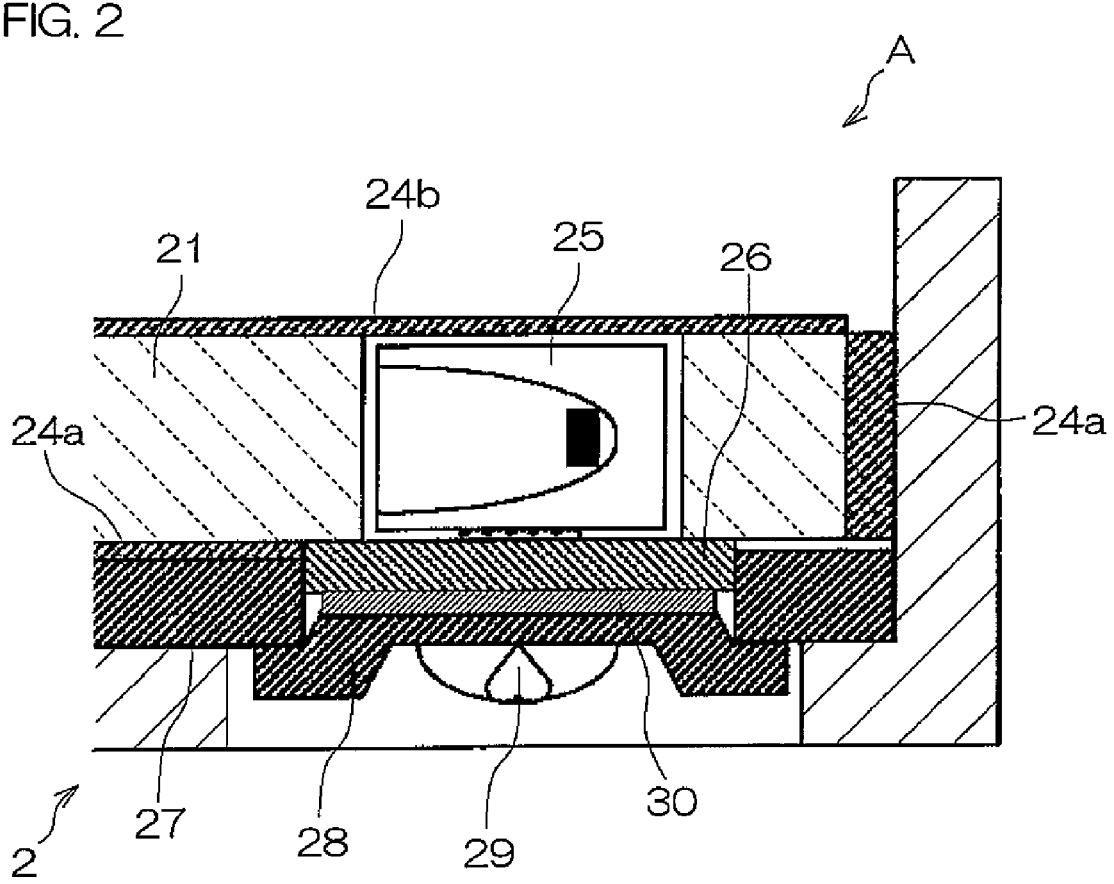
FIG. 2 is a partially enlarged view of a part A of the liquid crystal display device according to the present invention.

FIG. 1 is a schematic sectional view of the liquid crystal display device according to the present invention. FIG. 2 is an enlarged view of a part A in the vicinity of the light emitting diode module in FIG. 1.

Broadly speaking, the elements constituting the liquid crystal display device according to the present invention are a liquid crystal display panel 1, an LED backlight 2, and a frame 3 for fixedly holding the liquid crystal display panel 1 and LED backlight 2.

Figure 6:
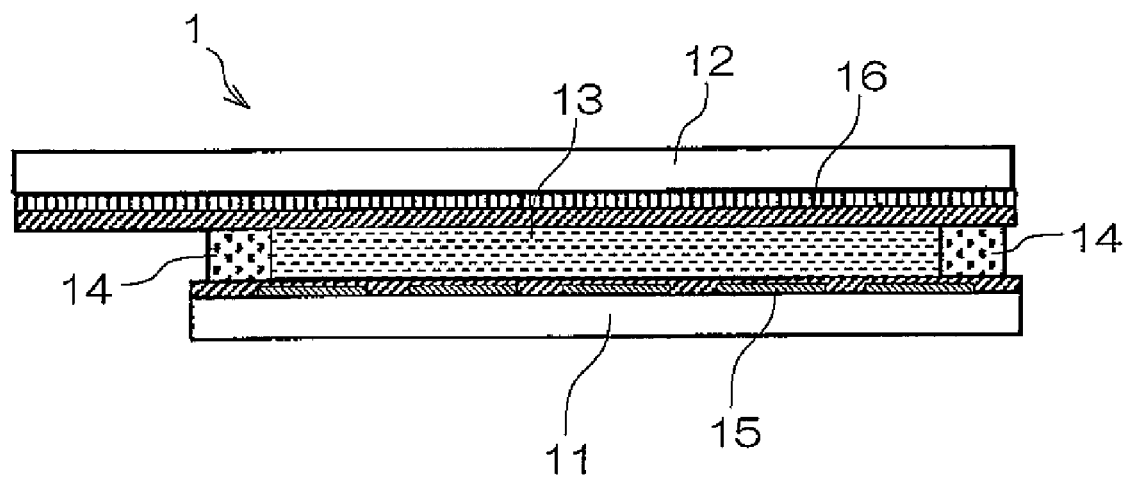
FIG. 6 is a schematic view showing a sectional structure of the liquid crystal display panel of the present invention.

FIG. 6 shows a schematic sectional view of the liquid crystal display panel 1.

The liquid crystal display panel 1 includes a lower transparent substrate (second substrate) 11 and an upper transparent substrate (first substrate) 12, and a liquid crystal layer 13 surrounded by a sealing part 14 is interposed between the both transparent substrates 11 and 12.

In addition, an internal structure 15 is formed on the upper surface (inner surface) of the lower transparent substrate 11, and an internal structure 16 is formed on the lower surface (inner surface) of the upper transparent substrate. The internal structures 15 and 16 each include display electrodes and an alignment film.

The display electrodes constituting the inner structure 15 and the display electrodes constituting the inner structure 16 are opposed to each other and arranged in the form of a matrix so as to form display pixel areas.

For example, in the case of a transmissive-type liquid crystal display device, all of the display electrodes are made of transparent electrodes, and one pixel constituting each display pixel area forms a light transmissive area through which light of the backlight can be transmitted.

In the case of a semi-transmissive liquid crystal display device, one pixel includes partly a light reflective area constituted of a reflective metal film and partly a light transmissive area that permits light from the backlight to penetrate, which are juxtaposed to each other. That is, in this semi-transmissive liquid crystal display device, in the reflective mode, display is accomplished by that external light entering from the display surface side is reflected at the light reflective area of the pixel area to be returned to the display area side, while in the transmissive mode, display is accomplished by that light of the backlight is transmitted through the light transmissive area to be emitted to the display surface side. This structure enables display in the reflective mode when the external light is intense, and display in the transmissive mode when the external light is weak.

There are also disposed, although not shown in the drawing, a polarization plate, a retardation plate, a diffusion plate and the like on the lower surface (outer surface) of the lower transparent substrate 11 and the upper surface (outer surface) of the upper transparent substrate 12 according to the need.

In addition, in order to accomplish color display, color filters may be provided in the locations corresponding to the respective pixel areas of either the internal structure 15 of the lower transparent substrate 11 or the internal structure 16 of the upper transparent substrate 12.

Also, depending on the display drive system, switching means may be formed in the respective pixel areas of the inner structure 15 of the lower transparent substrate 11 so as to control display for each pixel area.

Moreover, either one of the upper transparent substrate 12 and the lower transparent substrate 11 (for example, the upper transparent substrate 12) may be designed to have a relatively larger area in plan view, and a circuit pattern to be connected to display electrodes or switching elements may be provided in a peripheral area of the substrate with the larger area in plan view. In this case, it is preferable to provide a drive circuit for supplying the circuit pattern with a predetermined signal and a predetermined voltage, or an input terminal for connection to an external drive circuit.

The display electrodes of the substrate (for example, the lower transparent substrate 11) that is not provided with the circuit pattern may be electrically connected to the circuit pattern of the upper transparent substrate 12 side through conductive particles interposed between the both substrates 11 and 12.

The material for the lower transparent substrate 11 and the upper transparent substrate 12 may be glass, translucent plastic or the like. The display electrodes constituting the internal structures 15, 16 are formed using a transparent conductive material such as ITO and tin oxide, and the reflective metal film constituting the light reflection area is made of aluminum, titanium or the like. In addition, the alignment film is made of rubbed polyimide resin. When color filters are formed, resin to which dyes and pigments are added is used to form red, green and blue filters for the respective pixel areas. Also, black resin may be used for blocking light between the respective filters and around the pixel areas.

These lower transparent substrate 11 and upper transparent substrate 12 are bonded through the sealing portion 14 by pressure, and a liquid crystal agent including nematic liquid crystal or the like is injected from an opening part of the sealing portion 14, and then the opening is sealed. The bonding is carried out so that the both display electrodes arranged on the transparent substrates 11 and 12 are orthogonal to each other. An area formed by the intersecting display electrodes is a pixel area, and an assembly of the pixel areas forms a display area.

The liquid crystal display panel 1 is constructed as described above.

The LED backlight 2 is disposed on the lower side (outer side) of the lower transparent substrate 11 of this liquid crystal display panel 1.

The LED backlight 2 includes a light guide plate 21 and a light source disposed at a side end portion of the light guide plate 21 as shown in FIG. 1.

Meanwhile, on a first principal surface (light emitting surface) of the light guide plate 21, a lens sheet 22 and a diffusing sheet 23 are successively superposed, and a reflective sheet 24a is disposed on a second principal surface opposite thereto.

The foregoing light source includes an LED light source 25 which is a light emitting diode module, and an insulating substrate 26. The LED backlight 2 includes a heat sink substrate 27 having a heat sink function, and is disposed so that the first principal surface (light emitting surface) of the light guide plate 21 is opposed to the display area of the liquid crystal display panel 1.

The light guide plate 21 constituting the LED backlight 2 comprises, for example, a transparent resin substrate. A light diffusing material may be contained in the resin component.

A reflective sheet 24a by which light is diffused and reflected is disposed on the second principal surface of the light guide plate 21 as shown enlarged in FIG. 2. The reflective sheet 24a is provided for reflecting light propagating through the light guide plate 21 toward the first principal surface side. Instead of the reflective sheet 24a, grooves for diffusing and reflecting light may be formed on the second principal surface of the light guide plate 21 itself, or a coating film with diffusing and reflecting functions may be formed on the second principal surface of the light guide plate 21. In addition, this reflective sheet 24a may be formed not only on the second principal surface of the light guide plate 21, but also on four side end surfaces as appropriate. Further, a reflective sheet 24b is disposed above the LED light source 25 to prevent light from leaking.

The insulating substrate 26 constituting an insulator comprises a glass cloth based epoxy resin substrate, a ceramic substrate, a flexible substrate (for example, copper clad laminate including polyimide base film and the like) or the like, and the LED light source 25 is mounted on the upper surface thereof.

On the LED light source 25 mounting surface of this insulating substrate 26, metal wiring for supplying a predetermined drive current to the LED light source 25 is formed. A plurality of the LED light sources 25 is mounted at predetermined intervals on this metal wiring through a conductive member.

Figure 7:
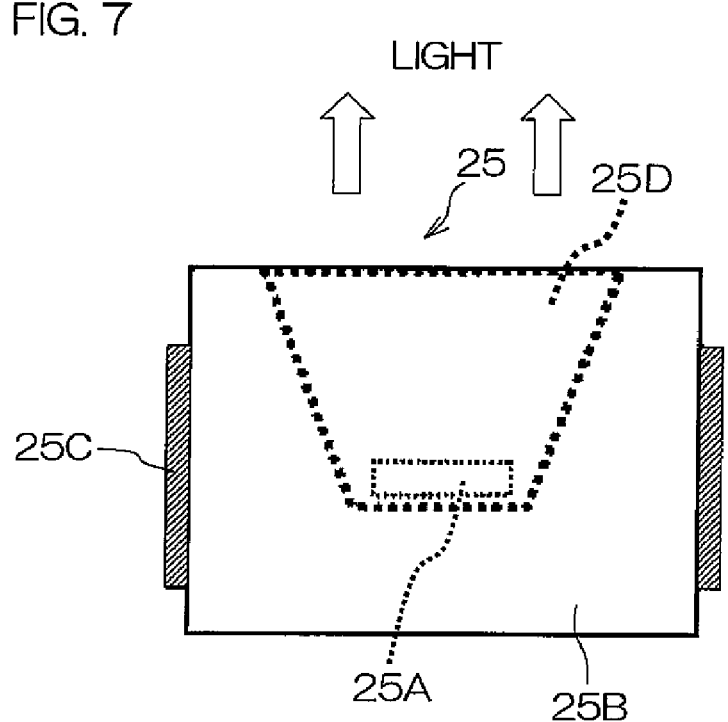
FIG. 7 is a schematic plan view of an LED module used for the liquid crystal display device according to the present invention.

The LED light source 25 includes, as shown by the plan view in FIG. 7, an LED chip 25A having a light emitting part formed of semiconductor material, an anode electrode and a cathode electrode, and a container 25B formed of a heat resistant resin material, ceramic material or the like.

The container 25B has a cavity 25D formed therein. The cavity 25D in this embodiment is formed in a mortar-like shape, and the LED chip 25A is disposed in a bottom part thereof. The anode electrode and the cathode electrode of this LED chip 25A are connected to voltage supply terminals 25C formed on surfaces of the container 25B other than the surface (light reflecting surface) of the cavity 25D.

Additionally, a reflective coating is applied on the surface of the cavity 25D to enhance light reflectivity. Further, the cavity 25D is filled with translucent resin or fluorescent resin so as to bury the LED chip 25A.

The container of the LED light source 25 has a back surface (the lower surface in FIG. 7) opposite to the light emitting surface (the upper surface in FIG. 7) and four side surfaces, and in particular, the side surface to be mounted on the first principal surface of the insulating substrate 26 is referred to as the "mounting surface". In FIG. 7, the mounting surface corresponds to the surface in the depth direction of the sheet.

The voltage supply terminals 25C are formed in a L-shape along the mounting surface and the side surface adjacent to the mounting surface.

Hereinafter, the structure for disposing the LED light source 25 at the predetermined location of the light guide plate 21 will be described.

Figure 3:
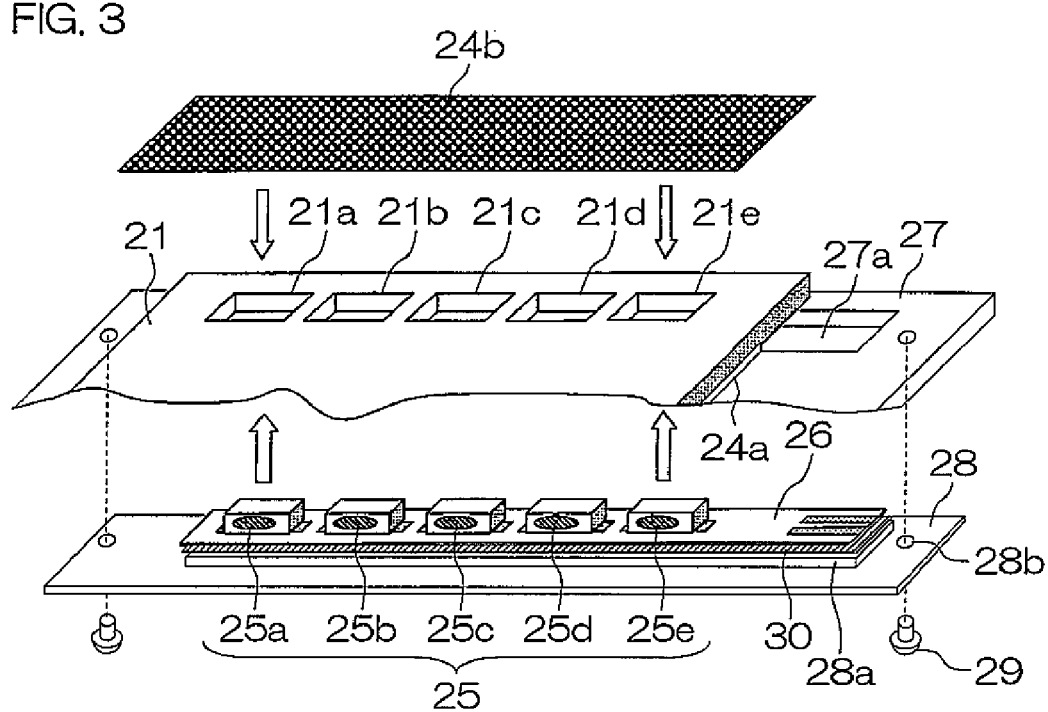
FIG. 3 is a schematically exploded, perspective view of the liquid crystal display device according to the present invention.

FIG. 3 is a schematically exploded perspective view showing a side end part of the LED backlight 2 on the light source side.

As FIG. 3 shows, a plurality of LED light sources 25a-25e are mounted on the insulating substrate 26.

Storing portions denoted by the symbols 21a-21e are formed in the light guide plate 21 at locations corresponding to the LED light sources 25a-25e mounted on the insulating substrate 26.

The storing portions 21a-21e are formed as through holes as shown in FIG. 3. Although these storing portions 21a-21e may extend the side end surfaces of the light guide plate 21, they are preferably in the form of through holes so that heat generated from the LED light sources 25a-25e is propagated more effectively to the heat sink substrate 27.

The storing portions 21a-21e may be formed into shapes other than through holes, such as recesses each having an opening only on the lower surface (back surface) side of the light guide plate 21 (recesses having depths for storing LED light sources 25a-25e smaller than the thickness of the light guide plate 21).

The shape of each of the storing portions 21a-21e provided in the light guide plate 21 in plan view is a shape substantially equal to or slightly larger than the outer most shape (see FIG. 7) of the LED light source 25 so that the LED light source 25 is disposed at a predetermined location.

In addition, the reflective sheet 24a is disposed on the upper surface (light emitting surface side of the light guide plate 21) of the LED light source 25 so as to prevent light emitted from the LED light source 25 from leaking.

Moreover, on the lower surface of the light guide plate 21, the heat sink substrate 27 is provided through the reflective sheet 24a. The heat sink substrate 27 is preferably formed of a high-thermal-conductivity metal.

The heat sink substrate 27 is formed with a long through hole 27a into which the insulating substrate 26 with the LED light sources 25a-25e mounted thereon is inserted.

In addition, a metal holding plate 28 is disposed on the lower surface of the insulating substrate 26 through a high-thermal-conductivity bonding material 30.

The metal holding plate 28 is lifted in the part corresponding to the contour of the insulating substrate 26 by a predetermined length. This lifted part is denoted by 28a. The insulating substrate 26 is mounted on the lifted part 28a to be closely attached and secured thereto.

A screw hole 28b in which a screw 29 for securing the metal holding plate 28 to the heat sink substrate 27 is screwed is formed around the foregoing lifted part 28a of the metal holding plate 28.

The metal holding plate 28 is secured to the heat sink substrate 27 through the screw hole 28b by means of the screw 29.

At this time, the LED light sources 25a-25e can be aligned with respect to the heat sink substrate 27 by fitting the lifted part 28a into the through hole 27a of the heat sink substrate 27.

Thus, as shown in FIG. 2, the surface of the area of the insulating substrate 26 on which the LED light source 25 is mounted (the upper surface in FIG. 2) comes into contact with a part of the second principal surface (lower surface) of the light guide plate 21 (for example, the peripheries of the storing portions 21a-21e).

In this way, the insulating substrate 26 is secured to the light guide plate 21 by the pressure of the metal holding plate 28 from below.

As described above, the insulating substrate 26, on which the LED light source 25 is mounted, can be disposed at a predetermined location through the though hole 27a, and the side end surfaces of the storing portions 21a-21e of the light guide plate 21 (surfaces along the thickness of the light guide plate) can be disposed so as to be opposed to the light emitting surface of the LED light source 25 (see FIG. 2).

It is more preferable that the side end surfaces of the storing portions 21a-21e (surfaces along the thickness of the light guide plate) and the light emitting surface of the LED light source 25 are disposed so as to be in contact with one another, whereby light transmittance can be improved.

While in this embodiment, the metal holding plate 28 is secured to the heat sink substrate 27 by means of the screw 29, the securing means is not limited to this so long as the metal holding plate 28 and heat sink substrate 27 are in surface contact with each other. For example, the metal holding plate 28 may be secured to a frame constituting an exterior case using the screw 29.

Now, the structure for dissipating heat generated from the LED light source 25 is described.

Specifically, heat generated at the LED chip 25A propagates through the container 25B to be radiated around the container 25B, and propagates to the insulating substrate 26 mainly through the wiring conductor and the voltage supply terminals 25C. The heat conducted to the insulating substrate 26 propagates to the heat sink substrate 27 mainly through the high-thermal-conductivity bonding material 30 and the metal holding plate 28.

Thus, heat generated at the LED light sources 25 is effectively dissipated to the outside through the heat sink substrate 27, and therefore becomes less prone to be stored in the LED light source 25 and the insulating substrate 26. As a result, temperature increase in LED light source 25 and its vicinity can be controlled effectively.

This heat dissipation effect becomes greater as the display area of the liquid crystal display panel 1 becomes larger together with the size of the light guide plate 21, and as more LED light sources 25 are mounted on the insulating substrate 26 to supply sufficient amount of light to the enlarged light guide plate 21.

Figure 8:
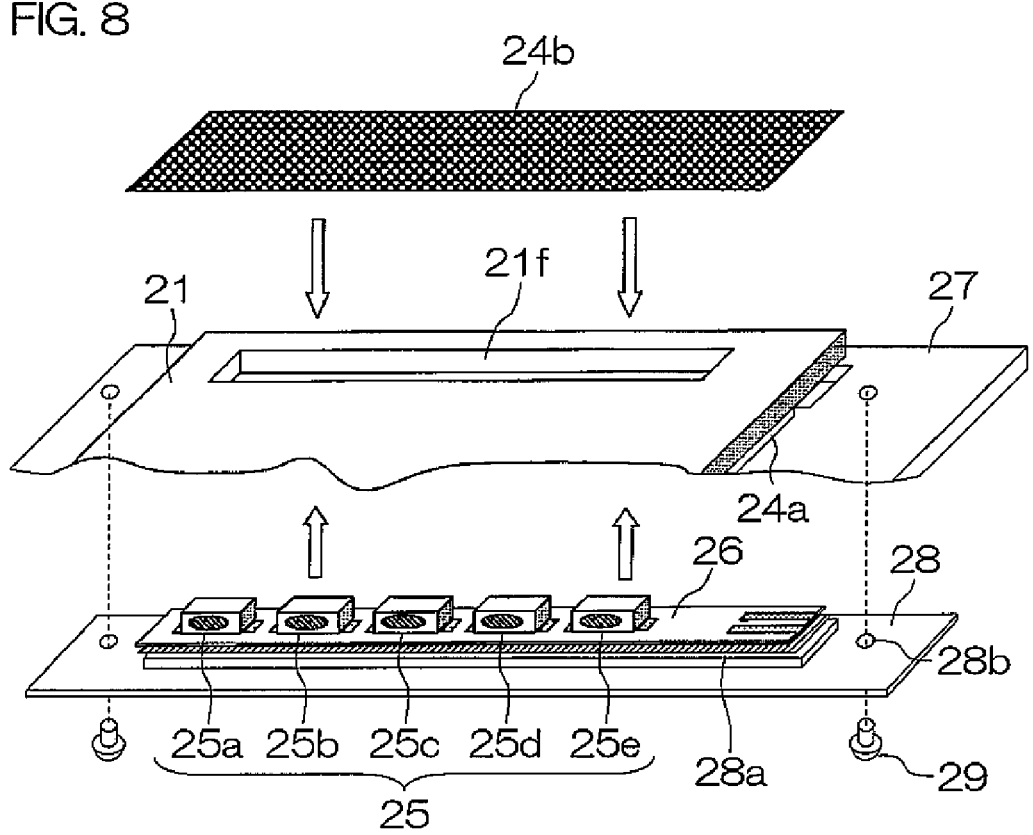
FIG. 8 is a schematically exploded, perspective view of another example of a liquid crystal display device according to the present invention.

In addition, as shown in FIG. 8, an storing portion 21f capable of storing the plurality of LED light sources 25a-25e in a collective manner may be provided in a side end portion of the light guide plate 21 at a location corresponding to the LED light sources 25a-25e disposed on the insulating substrate 26. This storing portion 21f may be in the form of a through hole, a recess or the like. Although the storing portion 21f may be communicated with the side end surfaces of the light guide plate 21, it is preferably in the form of a through hole so that heat generated from the LED light sources 25a-25e is propagated to the heat sink substrate 27 more effectively.

The shape of the storing portion 21f formed in the light guide plate 21 may be substantially equal to or slightly larger than the outermost shape of the arrangement configuration of the plurality of LED light sources 25 arranged in a row so that the row of the LED light sources 25 can be disposed at a predetermined location. This is advantageous because changing the design of the light guide plate 21 itself is not necessary even when the number of the light emitting diode modules to be mounted on the insulating substrate is changed for changing the brightness of the LED backlight 2.

The storing portion 21f may be provided on its inner surface with a protruded portion that contributes to positioning of the LED light source 25.

In the foregoing manner, heat stored in the insulating substrate with the light emitting diode module mounted thereon is reduced, and temperature increase in the light emitting diode module is minimized, whereby decrease in luminous efficiency of the light emitting diode module can be restricted, and bright and long-life liquid crystal display can be accomplished.

Figure 4:
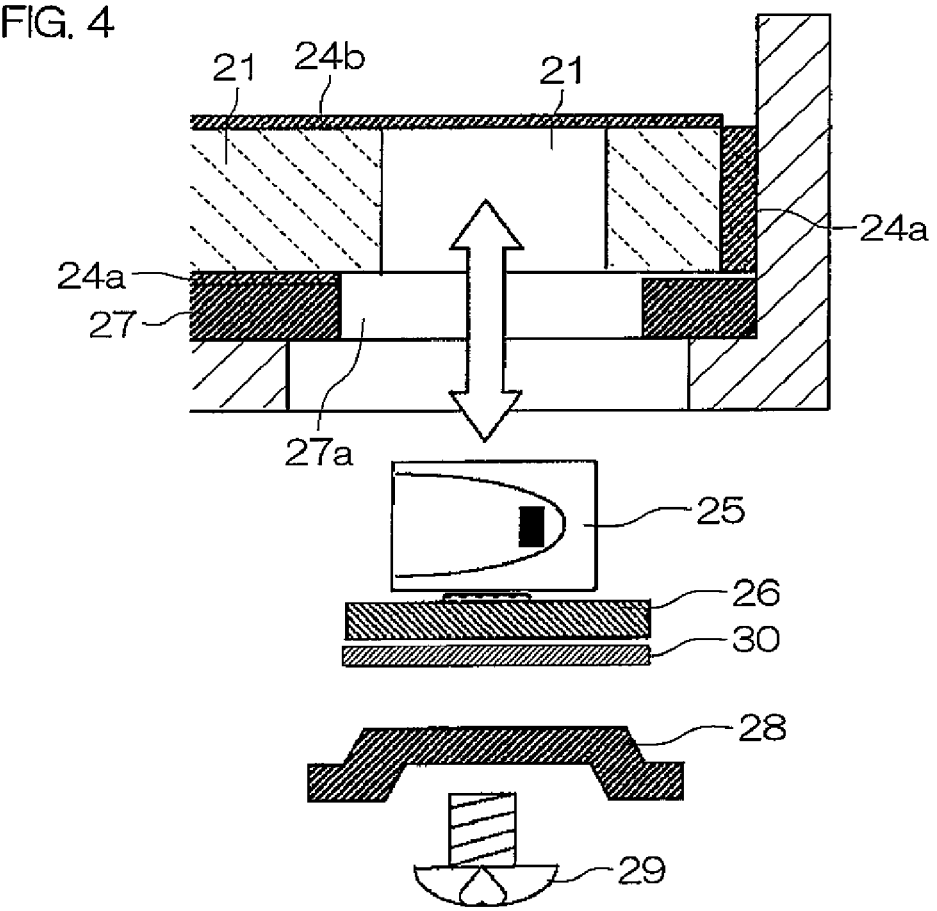
FIG. 4 is a schematic view for illustrating an attachment/detachment structure of a light emitting diode module for the liquid crystal display device according to the present invention.
Figure 5:
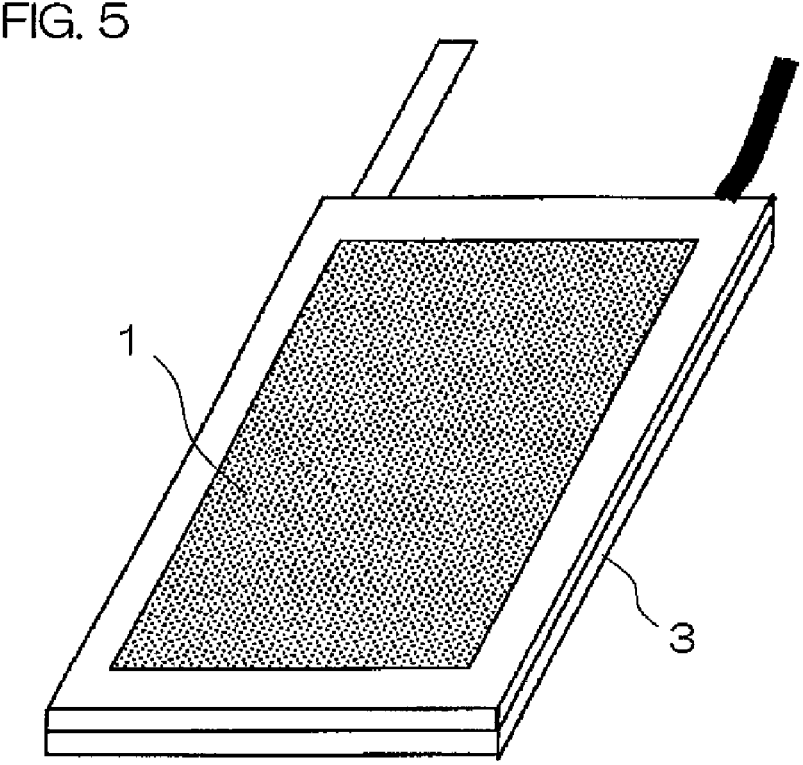
FIG. 5 is a perspective view of an external appearance of the liquid crystal display device according to the present invention viewed from a display surface.

Furthermore, as shown in FIG. 4, a liquid crystal display device including an LED backlight 2 in which the light emitting diode module is replaceable can be provided.

Example

A 1.2 mm thick aluminum was used to form a heat sink substrate 27 and a metal holding plate 28, and a 0.125 mm thick thermoconductive adhesive tape, No. 8805 produced by Sumitomo 3M Limited, was used for a high-thermal-conductivity bonding material 30. The insulating substrate 26 and the metal holding plate 28 are bonded and fixed together by means of the bonding material 30, and the heat sink substrate 27 was secured to the metal holding plate 28 so that they were in surface contact with each other.

Here, the thermal conductivities of the materials used including glass epoxy for the insulating substrate, aluminum for the heat sink substrate and the holding plate, and thermal conductive adhesive tape for the high-thermal-conductivity bonding material were 0.45 W/m·K, 236 W/m·K and 0.6 W/m·K, respectively.

Heat generated with light emission of the LED light source 25 is propagated through the insulating substrate 26, the high-thermal-conductivity bonding material 30, and the holding plate 28 made of aluminum to the heat sink substrate 27 formed of aluminum, where the heat is dissipated.

Then, using a liquid crystal display panel 1 with a 4.7 inch display area, sixteen LED light sources 25 were aligned and mounted on the insulating substrate 26. An electric current of 20 mA was applied to each of the LED light sources 25 under a room temperature (25° C.), and the temperature around the LED light sources 25 inside the backlight was measured.

As a result, it was found that the temperature around the LED light sources 25 could be as low as 43° C., and the estimated lifetime of the LED light sources could be extended to approximately 6600 hours. In addition, although the degree was minute, improvement was observed in luminous efficiency of the LED light sources.

The foregoing results of the experiment verifies that by having the holding plate 28 in close contact with the insulating substrate 26 by means of the high-thermal-conductivity bonding material 30, and closely attaching the metal holding plate 28 to the heat sink substrate 27 to improve the heat conduction so that heat generated from the LED light sources 25 is dissipated to the heat sink substrate 27 efficiently, heat stored in the LED light sources 25 and the insulating substrate 26 can be reduced, and temperature increase in the LED light sources 25 and regions around them can be minimized. This enables to control decrease in lifetime and luminous efficiency of the LED light sources 25, and to provide a bright, long-life liquid crystal display device having a structure that allows the light emitting diode modules to be replaced.

Implementation of the present invention is not limited to the foregoing embodiments. For example, while in the light guide plate 21 in FIG. 1, the thickness of the end surface on the side where the LED light source 25 is disposed is the same as the thickness of the other end surface opposed thereto, it may be a wedge-shaped member in which the thickness of the opposed end surface is smaller. In addition, the heat sink substrate 27 may be constructed integrally with the frame 3, or only the exposed surface of the heat sink substrate 27 may be covered with molded resin.

In addition, instead of the thermoconductive adhesive tape, a thermoconductive adhesive agent (eg. SE4420 produced by Dow Corning Toray Silicone Co., Ltd. with a thermal conductivity of 0.92 W/m·K) may be used to bond the insulating substrate 26 and the holding plate 28 together.

The invention claimed is:
1. A liquid crystal display device comprising:
a liquid crystal display panel, a back light configured to emit a light toward the liquid crystal display panel, and a case for housing the back light,
wherein the back light comprises:
a light guide plate;
a heat sink substrate disposed on a first principal surface of the light guide plate;
a light source comprising a light emitting diode module for emitting the light into the light guide plate;
a heat sink substrate having a first principal surface opposed to the light guide plate and a second principal surface; and
a holding plate that supports the light source and is removably attached to the second principal surface of the heat sink substrate;

wherein the holding plate is removable to the outside of the case; and wherein the case has a hole through which the light source is removable to the outside of the case.

2. The liquid crystal display device according to claim 1, wherein an storing portion for storing the light emitting diode module is formed in an end portion of the light guide plate.

3. The liquid crystal display device according to claim 2, wherein the storing portion is formed to store a plurality of the light emitting diodes separately from each other.

4. The liquid crystal display device according to claim 2, wherein the storing portion is formed to store a plurality of the light emitting diodes collectively.

5. The liquid crystal display device according to claim 2, wherein the storing portion is formed to penetrate the light guide plate in a thickness direction thereof.

6. The liquid crystal display device according to claim 2, wherein the storing portion for storing the light emitting diode module has a depth that is smaller than a thickness of the light guide plate.

7. The liquid crystal display device according to claim 1, wherein the heat sink substrate has a through hole, and the holding plate is in contact with a periphery of the through hole.

8. The liquid crystal display device according to claim 1, wherein a high-thermal-conductivity bonding material is interposed between the light source and the holding plate.

9. The liquid crystal display device according to claim 1, wherein the light source includes an insulating substrate on which the plurality of the light emitting diode modules is mounted in an aligned state.

10. The liquid crystal display device according to claim 1, wherein the liquid crystal display panel comprises a display area with a plurality of pixel areas.

\* \* \* \* \*